United States Patent

Karper et al.

[15] 3,693,421
[45] Sept. 26, 1972

[54] ELASTOMER TESTING INSTRUMENT

[72] Inventors: Paul W. Karper, 3391 Charring Cross Drive, Stow, Ohio 44224; John P. Porter, 3028 West Bailey Road, Cuyahoga Falls, Ohio 44221

[22] Filed: June 15, 1971

[21] Appl. No.: 153,394

Related U.S. Application Data

[63] Continuation-in-part of Ser. No. 880,786, Nov. 28, 1969, abandoned.

[52] U.S. Cl. .......................... 73/101, 73/12, 73/15.6
[51] Int. Cl. ............................................. G01n 3/30
[58] Field of Search ....................... 73/101, 15.6, 12

[56] References Cited

UNITED STATES PATENTS 3,468,161  9/1969  Wise ............................ 73/101
3,494,172  2/1970  Juve et al. ................. 73/101 X Primary Examiner—Jerry W. Myracle
Attorney—Joseph Januszkiewicz

[57] ABSTRACT

Stress relaxation apparatus and method which applies a sudden impulse torque to a heated or an unheated sample of material of uncured or cured elastomeric material such that a stress relaxation measuring means located between the sample of material and the force applier is effective to measure the relaxation that occurs in the sample of material progressively.

24 Claims, 6 Drawing Figures

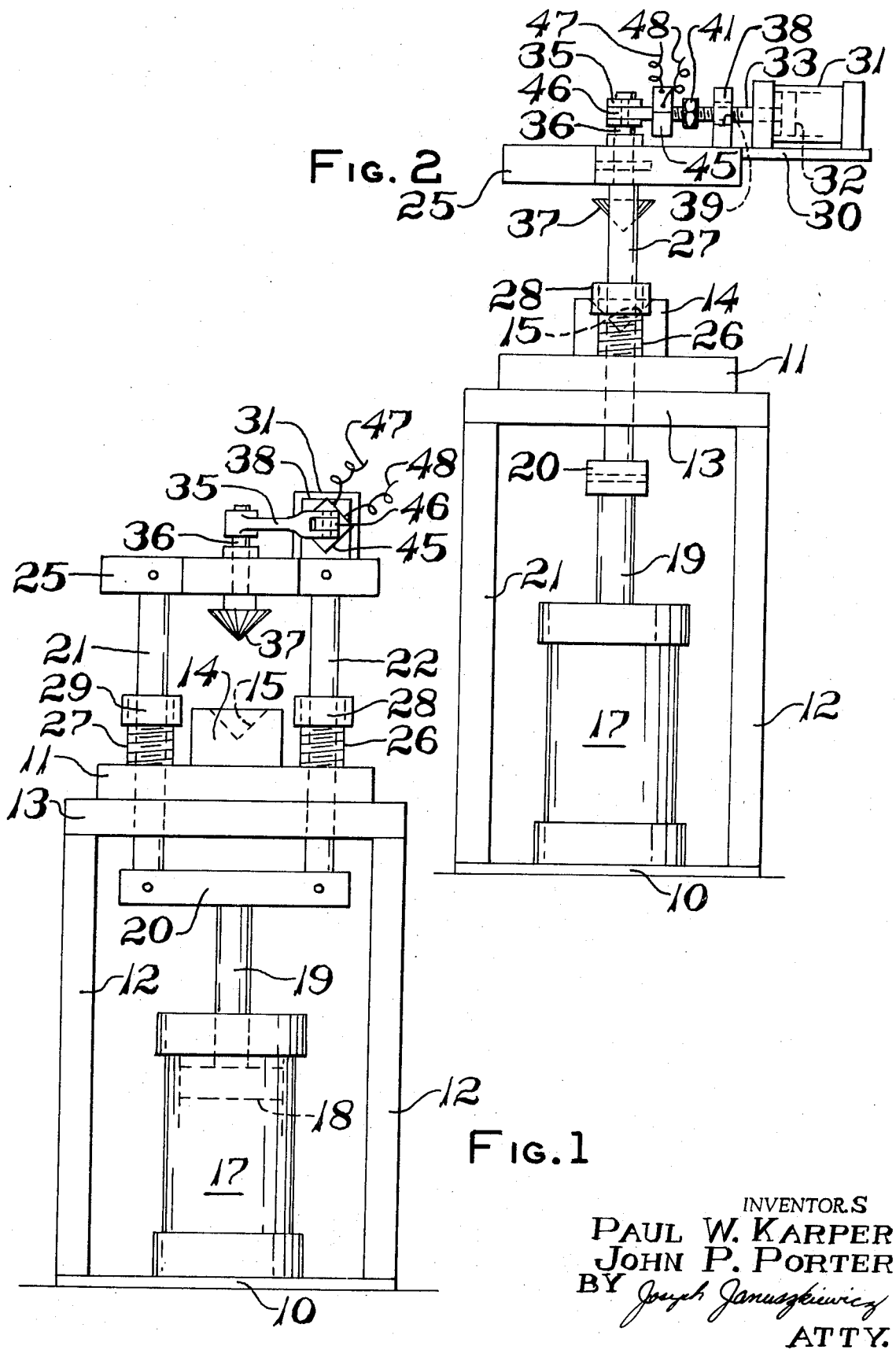

INVENTORS
PAUL W. KARPER
JOHN P. PORTER
BY Joseph Januszkiewicz
ATTY.

ELASTOMER TESTING INSTRUMENT

CROSS REFERENCE TO RELATED APPLICATIONS

This application is a continuation-in-part of U.S. Pat. application Ser. No. 880,786 filed Nov. 28, 1969, now abandoned.

BACKGROUND OF THE INVENTION

This invention relates to a testing apparatus and method, and more particularly to an apparatus and method for testing uncured and cured elastomeric materials for stress relaxation.

In the manufacture of products made of elastomeric material, it is important to know as much as possible about the pertinent physical properties of the materials in order to knowledgeably control the manufacture of the finished products. Decisions for product runs must be based on available data, after which such products must be accurately tested to determined whether they adhere to the specifications set forth, and, if not, in what manner they vary therefrom.

There is great need for an instrument which determines processing characteristics of materials such as stress relaxation wherein material supplied by a manufacturer claims such materials are similar to prior supplied material, yet in their processing, such materials present different manufacturing problems than prior batches. This is particularly desirable for one who desires dimensional stability, as where one is calendering stock which is to be processed into a thin web of material and it is necessary for the operator to be able to determined the shrink characteristics prior to setting up of the production run. Unless this can be determined, it is difficult to provide for the required size, without extensive testing and consuming considerable time.

One particular test which provides considerable information on the processability of elastomeric compounds is to measure nerve which term, as used here, is the ability of the material to recover from a stress such as the spring of an elastic material when extended. When a sudden application of shear stress is placed on black masterbatch compounds, as well as other viscoelastic material, and such materials are held at a constant strain, a molecular phenomenon occurs known as stress relaxation. This phenomenon corresponds to the release of entanglement couplings between the molecules of the rubber matrix and the uncoiling of long molecules. This is measured as torque decay or stress relaxation. A material having a long relaxation time has a high storage modulus indicating a "nervy" compound and is in general a bad processing compound. Other parameters being comparable, a compound with a relaxation time of 13 seconds could be considered good, whereas one with a longer time, i.e., 25 seconds, would be poor processing for a specific masterbatch for a specific end product by a specific technique.

One method heretofore used in the measurement of stress relaxation utilized a reservoir or container which held the sample which was heated to a specific temperature such as 210° F., after which such material was extruded through a fixed orifice such that the sample of material, as it passed through the opening would expand at a certain ratio. Periodic readings or measurements would be taken at different time intervals along the sample and compared to the orifice size to provide a reading which would indicate the percent of growth which is comparable to the stress relaxation. The time element utilized in performing such test would be approximately 2 hours, which requires interpreting the data and evaluating such data.

Another type of test instrument of measuring stress relaxation utilizes the technique of measuring change in tension in a sample maintained at a constant predetermined stretched length where the length is measured periodically. The results are expressed in terms of percentage of the initial tension and may be recorded on a chart as a curve plotted against time. Here, too, the time for testing is extensive.

SUMMARY OF THE INVENTION

The present invention contemplates a testing apparatus and method which provides means for accurately and quickly determining stress relaxation functions. The apparatus is designed to measure in seconds or fractions of seconds the time required for the initial indication of stress to decay to a fixed value which is indicative of the processability of the material. Such test apparatus comprises a stator die member which cooperates with a rotatable cone-shaped rotor member to receive and engage a sample of material under pressure so that upon the application of an impulsive rotation to the cone-shaped rotor member the sample is stressed. Impulsive is used in the sense of a sudden force applied. A load cell positioned between the actuator and the cone-shaped rotor measures the phenomena of relaxation within the specimen. Such die members may be either heated to a predetermined temperature or not depending on the condition of use of the material.

Another use of such testing apparatus of this invention is its application on O-rings such as those used on aircraft brake cylinders wherein criticality and consistency of product is desired. One of the present methods for testing such O-rings is to apply a specific load or deformation to the O-ring for a period of 24 hours at a prescribed temperature, and thereafter removing such load force and measuring the O-ring to determine the amount of recovery of such material. However, in such test the product is destroyed and, therefore, the producer can only check a certain percent of the total product; whereas, by applicants' apparatus every product can be tested and there is no destruction of the product. Such method confines the sample of material under pressure, thence subjects the confined sample to an impulsive force after which the stress relaxation is measured.

BRIEF DESCRIPTION OF THE DRAWINGS

FIG. 1 is a front elevational view of a preferred embodiment of the invention.

FIG. 2 is a side elevational view of the apparatus shown in FIG. 1.

DETAILED DESCRIPTION

Figure 3:
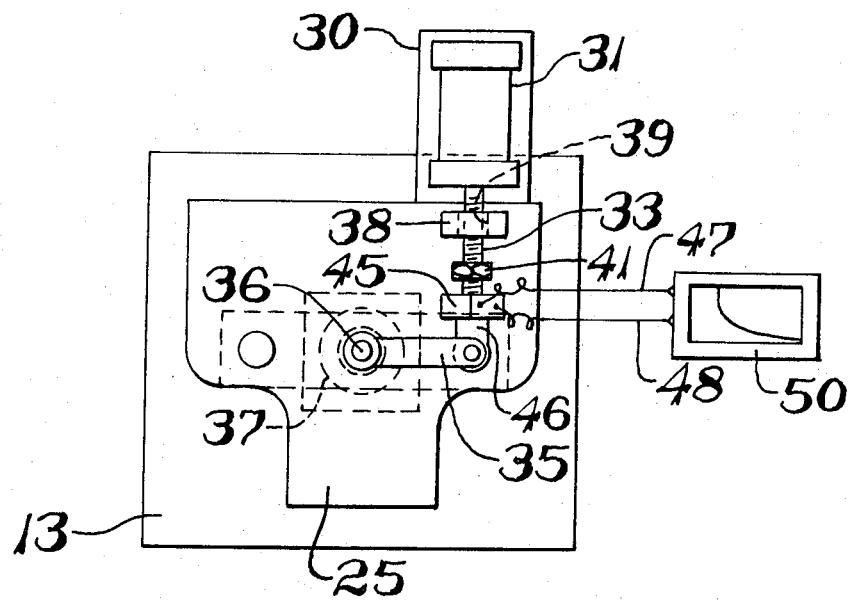
FIG. 3 is a plan view of the apparatus shown in FIG. 1.

Referring to the drawings wherein like reference characters designate like, or corresponding parts throughout the several views, there is shown in FIG. 1 a base 10 supporting a table 11 by a suitable structural framework 12 and horizontally extending brackets 13 which interconnect table 11 with the vertically extending structural framework 12. Suitably secured to the upper portion of table 11 is a stator die member 14 having a centrally disposed recess 15 which is for a purpose to be described. Mounted on base 10 is a pneumatic cylinder 17 having a piston 18 slidably mounted therein. Operatively connected to piston 18 is a vertically extending piston rod 19 having its upper end portion suitably connected to a yoke or cross member 20 which as rods 21 and 22 suitably connected thereto for movement through suitable bores in table 11. The respective upper end portions of rods 21 and 22 are connected to a horizontally extending plate member 25. Suitably mounted on table 11 are a pair of spaced hollow threaded members 26 and 27 which encompass rods 22 and 21 respectively and having threadedly mounted thereon stop nuts 28 and 29 whose adjustment thereon limits the downward movement of plate member 25 towards table 11 upon actuation of cylinder 17. The one end portion of plate member 25 has an extension 30 suitably connected thereto, which extension 30 supports a pneumatic cylinder 31 which has a piston 32 slidably journaled therein having its piston rod 33 suitably connected to one end of a load cell 45. Load cell 45 has its other end connected to a rod 46, which rod 46 is connected to the bifurcated end portion of a rod 35 (FIG. 1). The other end portion of the bifurcated rod 35 is keyed to a horizontally extending shaft 36 which is journaled for rotation on plate member 25 and for movement therewith. Shaft 36 has its lower end portion suitably connected to a conical projection or rotatable die member 37 which is adapted to be received by recess 15 on die member 14. Die member 37 has a serrated surface. Stator die member 14 and die member 37 are heated by suitable means such as heating coils such that the die members may heat the sample of material to the proper testing temperature and assist in forming the sample to the shape of the die. A suitable control unit would be used to regulate the heating coils in the die members to maintain the predetermined temperature on the die members and the sample of material. Generally the sample of material is heated under 210° F. as it would be undesirable to promote cure. The heating is done to simulate the condition of the material as it exists during the stage of processing that requires control or checking of properties, as in milling wherein the material is at an elevated temperature but below 200° F. A stop bracket 38 with a bore 39 extending therethrough is suitably mounted on plate member 25. Piston rod 33 has its intermediate portion extending through the bore 39 in stop bracket 38 such that a stop nut 41 threadedly mounted thereon is adapted to abuttingly engage such bracket 38 to limit the movement of the piston rod for a purpose to be described. Although the invention described disclosed the die member 37 as a cone-shaped projection, other mating shapes are contemplated.

Figure 4:
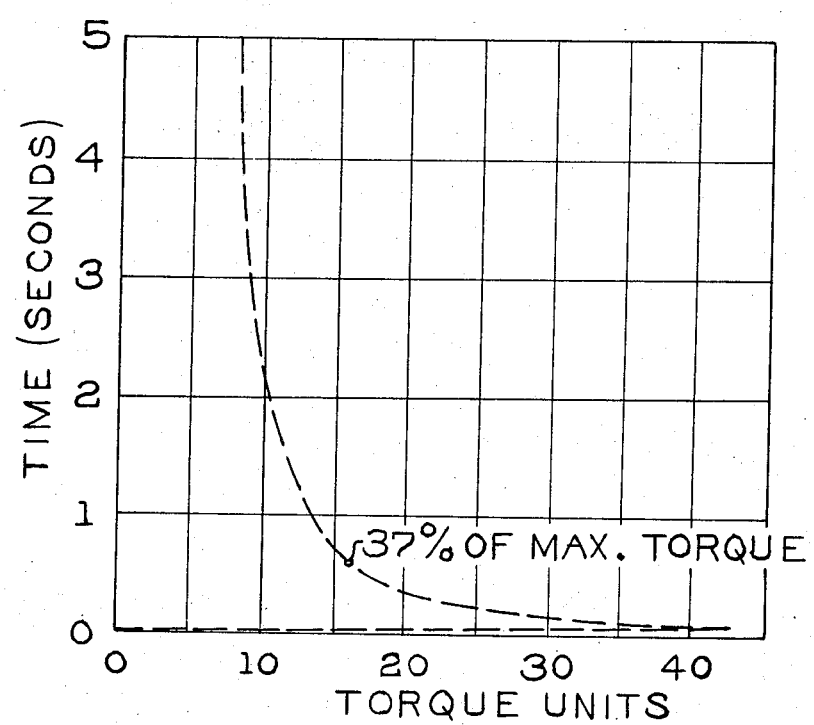
FIG. 4 is a reproduction of a curve illustrating the stress relaxation of a specimen.

Load cell 45 has a pair of leads 47 and 48 suitably connected to a recording device 50 which records the output of such load cell, measuring the torque in relation to time, as indicated by the chart in FIGS. 3 and 4. One recorder for this use can be the Model No. 1508 Visicorder made by Honeywell.

In the operation of the apparatus described, a sample of material is located within the recess 15, after which the operator pressurizes the rod end of cylinder 17, thereby moving piston 18 downwardly, as viewed in FIG. 1, which moves the respective rods 21 and 22, along with die member for conical projection 37, downwardly compressing the sample located in recess 15 and maintaining a predetermined regulated pressure thereon. Upon confinement of a sample under such pressures, the rod end of cylinder 31 is pressurized, moving piston rod 33 rightward (as viewed in FIG. 2), giving a small preselected degree of rotation (from 1° to 4°) to die member 37, as determined by the stop 41 engaging stop bracket 38, which in turn exerts a predetermined torque on the sample. The load cell 45, which is positioned between the air cylinder 31 and the shaft 36 measures the amount of relaxation which occurs within the specimen and which relaxation is registered within the load cell through its connection thereto for registering an output therein which is recorded by the recorder 50. As indicated above, such shearing stress has a rapid action which is applied to the confined sample being held in a stressed condition in a matter of seconds. The measurement of the stress relaxation is a measure of the phenomena known as stress relaxation within the material due to the molecular structure realignment which is a lessening of the pressure through the load cell 45. As will be observed in FIG. 4, beginning at time interval zero, an impulsive (2–10 milliseconds) torque is imposed upon the sample which is approximately 42.5 units and while such stress is maintained on the sample, stress relaxation immediately occurs. FIG. 4 exaggerates the 2–10 milliseconds time only to visually indicate that the maximum is achieved starting from zero. Although a predetermined impulse is applied there is a negligible movement in the load cell in the probability of 0.001 inch range. However, such force may be considered predetermined. Within one second after the application of such predetermined force, the torque within one second is approximately 12 units and within 3 seconds it is approximately 9 units. It has been determined that by taking 37 percent of the maximum torque imposed, which is 42.5 units, one obtains a reading of 15.7 units, which is the torque remaining in approximately one-half second thereby giving a guide number for comparison with another number. The 37 percent taken is the theoretical percentage in stress relaxation studies used for comparison with other similarly obtained data.

A modification of the apparatus as shown and described is to have the piston 17 connected to the table 11 for moving the die member 14 toward and away from die member 37 while maintaining such die member 37 stationary as by connecting such die member 37 to the structural framework 12 by guide rods. The functioning of the apparatus is otherwise identical to that described in the first embodiment.

A further modification of the apparatus is similar in all respects to the first described embodiment except that the die members are heated to a predetermined temperature prior to the energization of cylinder 31 which effects the preselected rotation of die member 37 to exert the predetermined torque. The lower the temperature the higher the peak and the slower the material relaxes.

Figure 5:
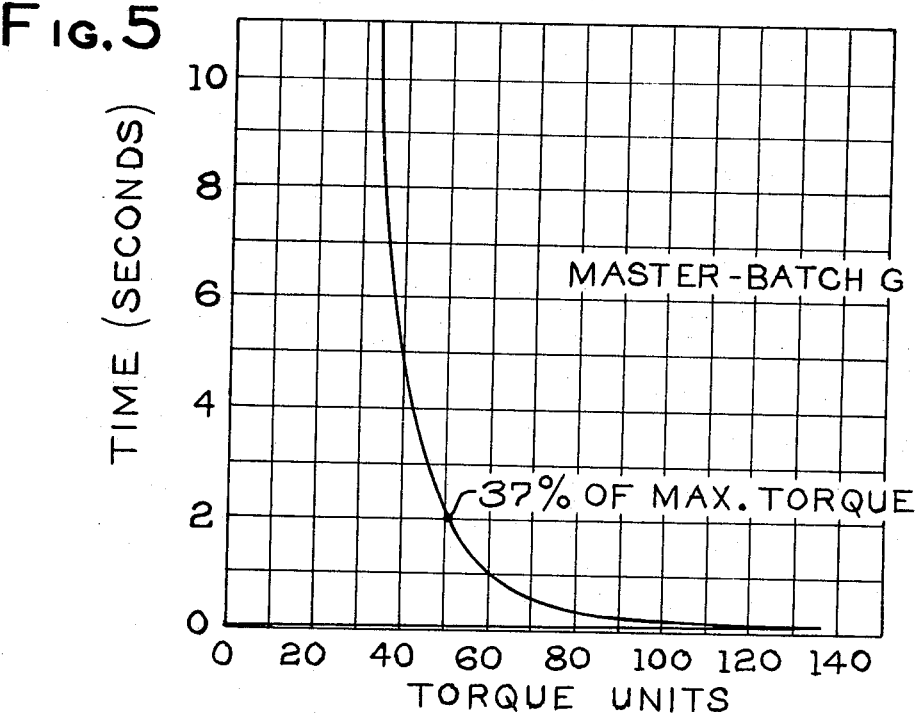
FIG. 5 is a reproduction of a curve, obtainable from the output of the test apparatus of the present invention as illustrated in FIGS. 1 and 2.
Figure 6:
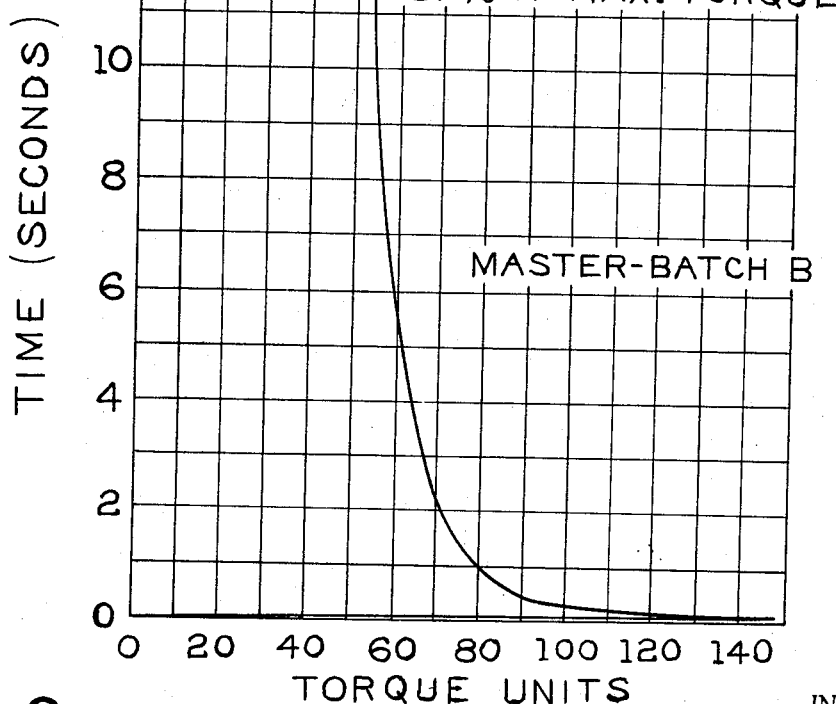
FIG. 6 is a reproduction of a curve obtainable from the output of the test apparatus of the present invention on a sample of material different than that used in obtaining FIG. 5.

As a further example of the use of such an instrument and method, reference is made to FIGS. 5 and 6 which illustrate the testing of compounds G and B which compounds are made of a styrene-butadiene rubber containing carbon black and oils.

| Test | Compound | Stroke | Time to 37% | Max. torque units | Time | Comparison torque units |
|---|---|---|---|---|---|---|
| 1 | G | 4° | 2 sec. | 136 | 585% | 109% |
|   | B | 4° | 11.7 sec. | 148 |  |  |
| 2 | G | 3° | 4.5 sec. | 119 | 415% | 110% |
|   | B | 3° | 18.7 sec. | 131 |  |  |
| 3 | G | 2° | 8.2 sec. | 100 | 277% | 116% |
|   | B | 2° | 22.7 sec. | 116 |  |  |
| 4 | G | 1° | 14.2 sec. | 71 | 243% | 111% |
|   | B | 1° | 34.6 sec. | 79 |  |  |

Such compounds G and B are masterbatches supplied and designated as having similar physical properties; however, in processing the one masterbatch G was found to have good processing characteristics while the other masterbatch B had poor processing characteristics. With the stress relaxation apparatus above described, curves of FIGS. 5 and 6 were obtained by first rotating the die member at a stroke of 4° on a sample having a thickness of 0.1 inch. Data was then obtained which is recorded in the above chart. Other tests of the same sample were run at different strokes as indicated, yielding similar curves, however, only the data is recorded on the above chart.

The first test run on sample G, as indicated of 0.100 inch thickness at a 4° stroke (FIG. 5) resulted in a maximum torque of 136 units, 37 percent of which is 50.32 torque units. The time necessary to reach 50.32 units is 2 seconds; whereas, the sample B has a maximum torque of 148 units, 37 percent of which is 54.76 units and determining the percentage of which B bears to G, one obtains 148/136 × 100 percent, or approximately 109 percent, whereas, in comparing the time units of B to G one obtains 11.7/2 ×100% = 585%. Test run number 2 was run under similar conditions, except that a three degree rotation was given to the samples. The torque percentage was approximately the same as in test 1; however, the ratio of time of sample B/G expressed as a percentage was 415 percent still indicating the tremendous difference between the samples. As the percentage of rotation is reduced, the percentage ratio of stress relaxation is less; however, the curves and data obtained indicate the reliability in comparing stress relaxation by the method and apparatus described.

The advantage of the stress test instrument is that it provides a device and method for rapidly and accurately testing the stress relaxation of uncured and cured elastomeric materials, without the requirements of a skilled operator or chemist. Further, the time necessary to run accurate tests is reduced considerably.

Various modifications are contemplated and may obviously be resorted to by those skilled in the art, without departing from the described invention, as hereinafter defined by the appended claims.

We claim:

1. An apparatus for testing stress relaxation within a compound comprising a base, a first support member mounted on said base, a second support member mounted on said base for movement toward and away from said support member for moving said second support member toward and away from said first member, die means on each of said members, said die means cooperative on movement of said second member toward first member to define a test cavity, motive means mounted on said second member, said motive means having an impulse output upon actuation, a piston rod extending outwardly from said motive means operative upon actuation to transfer to said rod said impulse output which extends said piston rod a predetermined distance and maintains said piston rod in said extended position, connecting means operatively connected to said die means on said second member to rotate said die means on said second member relative to said die means on said first member, torque sensing means operatively interconnecting said piston rod and said connecting means, and said torque sensing means operative upon actuation of said motive means to provide an output signal that is a function of time elapsed upon movement of said rod through said predetermined distance.

2. An apparatus for testing stress relaxation as set forth in claim 1 wherein a recorder means is operative to receive said output signal from said torque sensing means for recording said stress relaxation as a function of time.

3. An apparatus for testing stress relaxation as set forth in claim 2 wherein heating means are operatively connected to said support members for maintaining said die members at a predetermined temperature.

4. An apparatus for testing stress relaxation as set forth in claim 2 wherein said piston rod has adjusting means thereon for limiting the stroke and the impulse force of said piston rod.

5. An apparatus for testing stress relaxation as set forth in claim 4 wherein said means on said piston rod is adjustable for limiting the stroke on said piston rod to a range of 1° to 4° of rotation of said die means on said second member.

6. An apparatus for testing stress relaxation as set forth in claim 5 wherein said stroke of said rod is effected within 2 milliseconds.

7. An apparatus for testing stress relaxation as set forth in claim 6 wherein heating means are operatively connected to said support member for maintaining said die members at a predetermined temperature.

8. An apparatus for testing stress relaxation within a compound comprising a base, a pair of support members mounted on said base, one of said support member movable relative to the other of said support members, power operated means connected to said one support member for moving said one support member toward and away from the other of said support members, die means on each of said members, one of said die means being journaled for rotation on said one support member, said die means cooperative on movement of said one member toward said other member to confine a sample of material therebetween, an impulse output motive means mounted on said one member for movement therewith, said motive means having an output rod extending outwardly therefrom, connecting means operatively connected to said one die means for rotating said one die means through an arc upon actuation of said impulse output means, torque sensing means operatively interconnecting said rod and said connecting means to provide an output signal that indicates the stress relaxation in said sample of material confined between said die means as a function of time elapsed, and said motive means operative upon actuation to extend said rod a predetermined distance and maintaining said rod in said extended position for exerting an impulsive torque upon material confined between said die means.

9. An apparatus for testing stress relaxation as set forth in claim 8 wherein heating means are operatively connected to said die means for maintaining said die means at a predetermined temperature.

10. An apparatus for testing stress relaxation as set forth in claim 8 wherein said rod has adjusting means thereon for limiting the stroke of said rod and the rotation of said one die means to a range of 1° to 4° of movement.

11. An apparatus for testing stress relaxation as set forth in claim 10 wherein said stroke of said rod is effected within 10 milliseconds.

12. A stress relaxation test instrument comprising: support means, a stator die means mounted on said support means, a rotatable die means mounted on said support means, said rotatable die means cooperative with said stator means to define a cavity therebetween, means operatively connected to one of said die means for moving said one die means relative to the other die means to provide predetermined sudden output force connected to said rotatable die means for exerting a predetermined force in a single direction thereto, torque sensing means operatively interconnecting said output means to said rotatable die means to provide an output signal that is a function of the torque force on said sample of material confined in said cavity, and recorder means operative to receive said output signal and record said output signal as a function of time.

13. A stress relaxation test instrument as set forth in claim 12 wherein said output means includes a pneumatic cylinder with a piston rod extending outwardly therefrom, lever means operatively connected to said rotatable die means, and said torque sensing means interconnecting said rod and said lever means for movement with said rod.

14. A stress relaxation test instrument as set forth in claim 13 wherein heating means are operatively connected to said support members for maintaining said die members at a predetermined temperature.

15. An apparatus for testing stress relaxation within a compound comprising a base, a pair of material confining die members cooperative to confine a test sample therebetween, drive means connected to one of said die members for exerting a predetermined unidirectional impulsive torque to said one die member, and torque sensing means operatively interconnecting said one die member and said drive means to provide an output signal that is proportional to stress on the sample of confined material, and recorder means operative to receive said output signal for recording and measuring stress relaxation of the sample of material confined between said die members as a function of time.

16. An apparatus for testing stress relaxation in uncured and cured elastomeric materials comprising support means, die means mounted on said support means, power operated means operable to position said die means into cooperative relationship to confine a sample of material therebetween, motive drive means, said motive drive means having an adjustable unidirectional impulse output, connecting means interconnecting said output of said motive drive means to one of said die means to provide a predetermined impulsive rotative input force to said one die means, torque sensing means interposed in said connecting means to provide an output signal, and recorder means operative to receive and record said output signal as a function of time elapsed subsequent said impulse output by said motive drive means.

17. A method of testing the stress relaxation of an elastomeric material, comprising: confining a sample of material under pressure, applying a single predetermined impulsive force to said sample of material, and measuring the relaxation of said sample of material to said impulsive force.

18. A method of testing as set forth in claim 17 wherein said impulsive force is an arc of constant predetermined amplitude not exceeding 10°.

19. A method of testing as set forth in claim 18 wherein said confined sample of material under pressure is heated to a predetermined temperature prior to applying said predetermined force thereon.

20. A method for testing as set forth in claim 17 wherein said impulsive force is an arc of constant predetermined amplitude not exceeding 4°.

21. A method for testing as set forth in claim 18 wherein said impulsive force is applied in less than one-hundredth of a second.

22. A method of measuring physical properties of an elastomeric material, comprising: confining a sample of material under pressure, applying an impulsive torque to said sample of material imposed by a drive means having a predetermined rate and stroke, and measuring the stress relaxation occurring in said sample of material to said impulsive force.

23. A method of measuring physical properties of an elastomeric material as set forth in claim 22 wherein said measuring is done at a location between said sample of material and said drive means.

24. A method of measuring physical properties of an elastomeric material as set forth in claim 23 wherein said confined material under pressure is heated to a predetermined pressure prior to applying said predetermined force.

* * * * *